(12) United States Patent
Hasse et al.

(10) Patent No.: US 10,118,589 B2
(45) Date of Patent: Nov. 6, 2018

(54) BELT RETRACTOR

(71) Applicant: TAKATA AG, Aschaffenburg (DE)

(72) Inventors: Hermann Hasse, Lonsee (DE); Robert Fleischmann, Neu-Ulm/Pfuhl (DE); Joachim Nuesseler, Langenau (DE); Peter Baumgartner, Guenzburg Reisenburg (DE); Thomas Schwer, Illertissen (DE); Armin Toth, Dornstadt (DE); Dirk Buchlaub, Muensingen (DE); Jochen Lang, Ulm (DE); Thomas Rupp, Ulm-Lehr (DE)

(73) Assignee: JOYSON SAFETY SYSTEMS GERMANY GMBH, Aschaffenburg (DE)

( * ) Notice: Subject to any disclaimer, the term of this patent is extended or adjusted under 35 U.S.C. 154(b) by 243 days.

(21) Appl. No.: 15/087,564

(22) Filed: Mar. 31, 2016

(65) Prior Publication Data
US 2016/0311397 A1    Oct. 27, 2016

(30) Foreign Application Priority Data

Apr. 24, 2015  (DE) .......................... 10 2015 207 558

(51) Int. Cl.
*B60R 22/28* (2006.01)
*B60R 22/34* (2006.01)

(52) U.S. Cl.
CPC .................. *B60R 22/3413* (2013.01)

(58) Field of Classification Search
CPC ......... B60R 22/28; B60R 22/34; B60R 22/38; B60R 22/3413
See application file for complete search history.

(56) References Cited

U.S. PATENT DOCUMENTS

| | | |
|---|---|---|
| 5,954,287 A | 9/1999 | Hirase |
| 5,984,223 A | 11/1999 | Hiramatsu |
| 6,113,022 A | 9/2000 | Ono et al. |
| 6,416,008 B1 | 7/2002 | Fujii et al. |

(Continued)

FOREIGN PATENT DOCUMENTS

| | | |
|---|---|---|
| DE | 197 06 108 A1 | 8/1997 |
| DE | 198 20 641 A1 | 11/1998 |

(Continued)

*Primary Examiner* — Sang K Kim
(74) *Attorney, Agent, or Firm* — Gordon Rees Scully Mansukhani, LLP

(57) ABSTRACT

The invention relates to a belt retractor for a safety belt, having: a belt reel (100, 200, 300, 400, 500, 600) for winding up the safety belt; a locking base (120, 220, 320, 420, 520, 620) which during normal operation is conjointly rotated with the belt reel and the rotary motion of which upon abrupt belt extraction is locked by means of a locking mechanism; and a belt force limiting installation which upon locking of the locking base permits relative rotation between the belt reel and the locking base.

It is provided according to the invention that the belt retractor has a deactivation installation which after a predefined maximum relative rotary angle between the locking base and the belt reel blocks the relative rotation which is permitted between the belt reel and the locking base by the belt force limiting installation and, on account thereof, deactivates the belt force limiting installation.

4 Claims, 11 Drawing Sheets

(56) References Cited

U.S. PATENT DOCUMENTS

| | | |
|---|---|---|
| 7,963,474 B2 | 6/2011 | Blum et al. |
| 9,333,942 B2* | 5/2016 | Schrade .............. B60R 22/4676 |
| 2004/0195422 A1 | 10/2004 | Fleischmann et al. |
| 2005/0284978 A1 | 12/2005 | Zolkower |
| 2006/0163410 A1* | 7/2006 | Blum .................. B60R 22/3413 |
| | | 242/379.1 |

FOREIGN PATENT DOCUMENTS

| | | |
|---|---|---|
| DE | 101 41 915 C1 | 12/2002 |
| DE | 10 2004 015 825 A1 | 10/2005 |
| DE | 10 2013 217 018 A1 | 10/2013 |
| DE | 10 2013 219 261 A1 | 12/2013 |
| EP | 1 462 323 A1 | 2/2004 |
| EP | 1 491 415 A1 | 6/2004 |
| JP | 2002-347573 A | 12/2002 |
| JP | 2010-089528 A | 4/2010 |

* cited by examiner

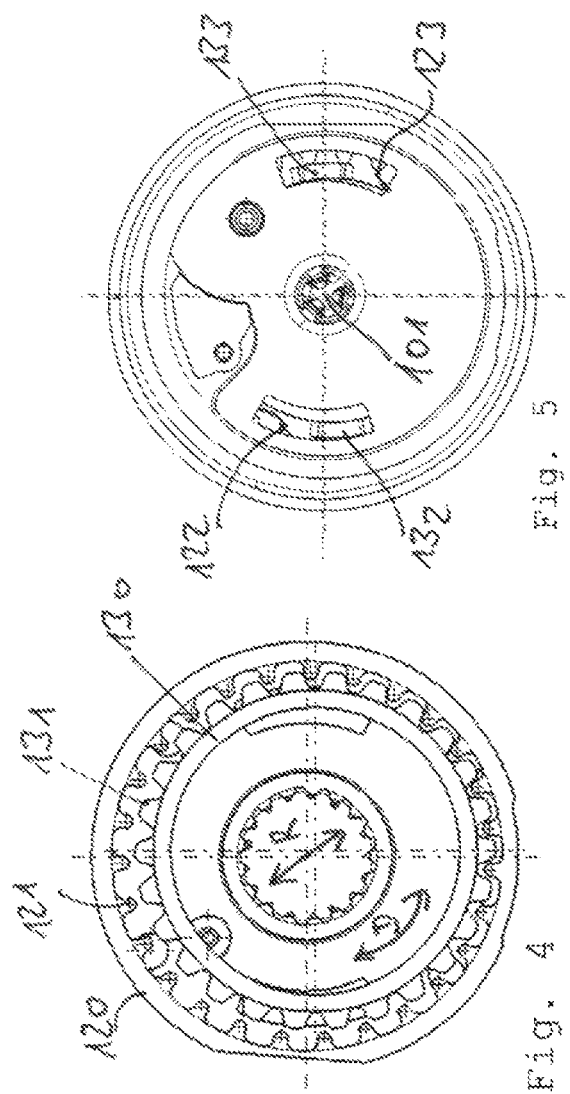

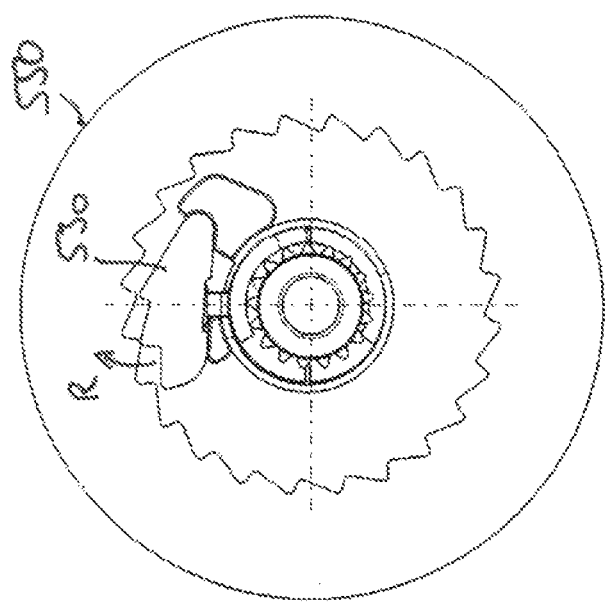
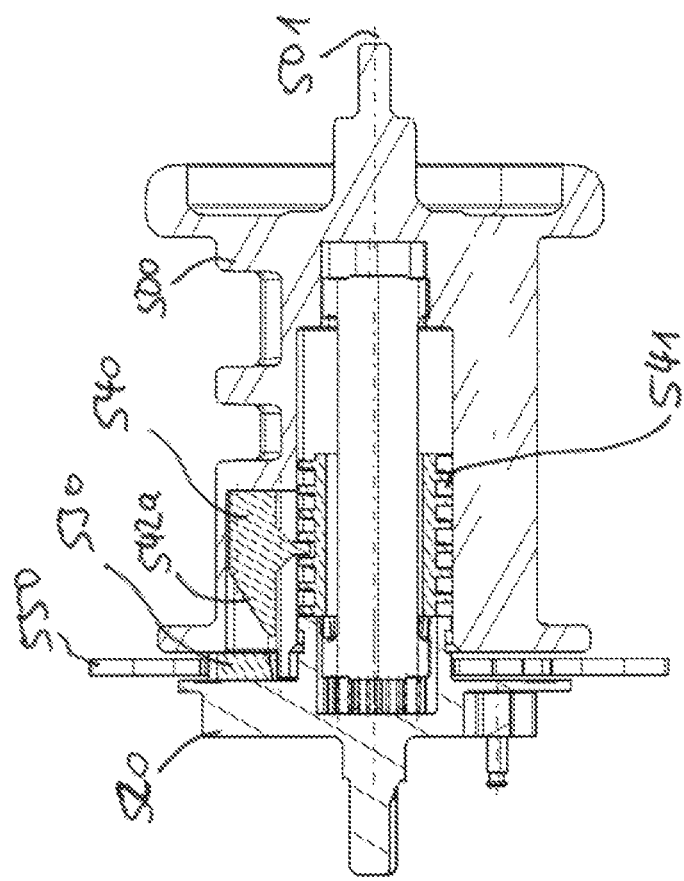
Fig. 19
Fig. 18

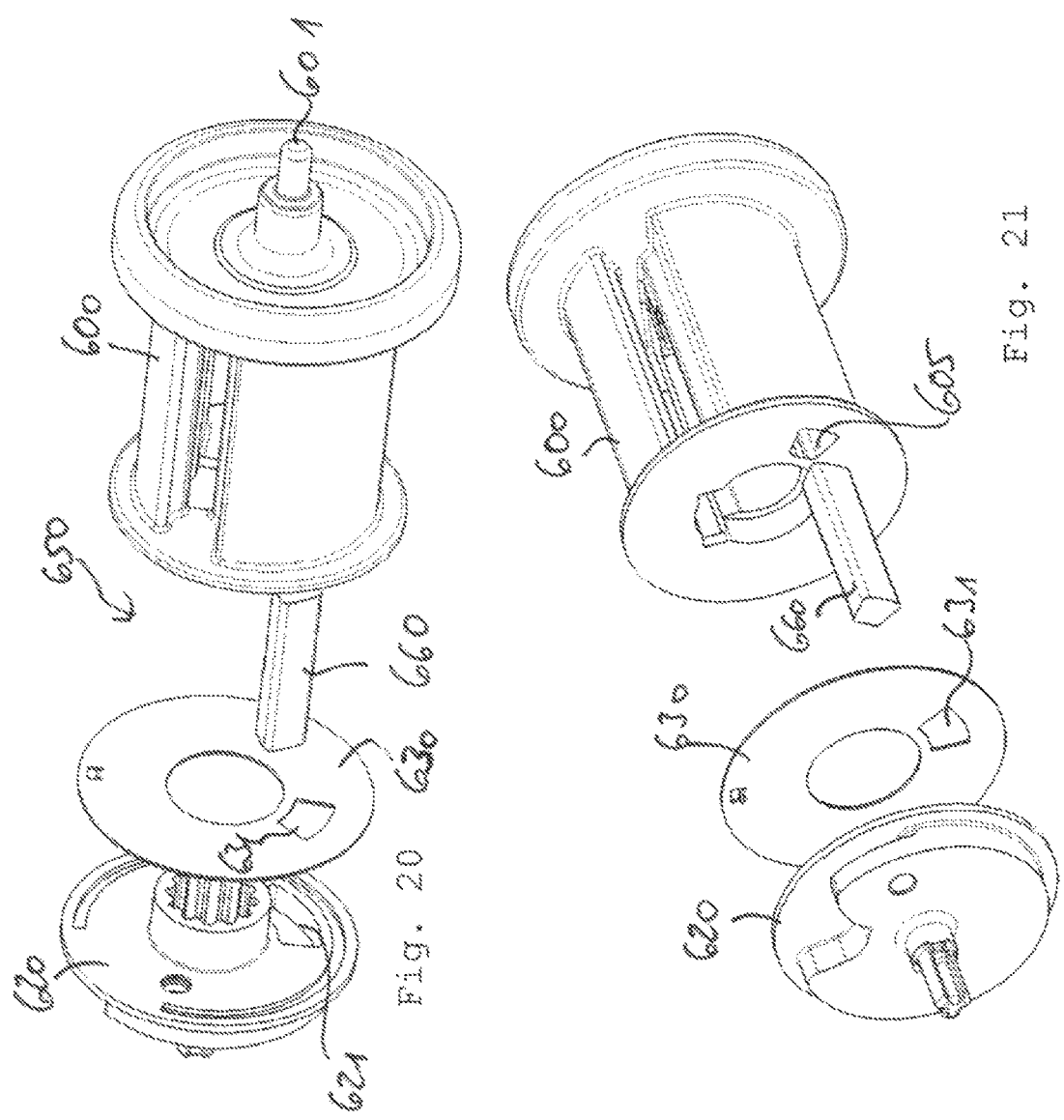

BELT RETRACTOR

The invention relates to a belt retractor for a safety belt, having a belt reel for winding up the safety belt, a locking base which during normal operation is conjointly rotated with the belt reel and the rotary motion of which upon abrupt belt extraction is locked by means of a locking mechanism, and a belt force limiting installation which upon locking of the locking base permits relative rotation between the belt reel and the locking base. A belt retractor of this type is known from the German unexamined and first publication DE 10 2013 217 018 A1, for example.

The invention is based on the object of further optimizing a belt retractor having a belt force limiting installation.

This object is achieved according to the invention by a belt retractor having the features according to patent claim 1. Advantageous embodiments of the belt retractor according to the invention are stated in dependent claims.

Accordingly, it is provided according to the invention that the belt retractor has a deactivation installation which after a predefined maximum relative rotary angle between the locking base and the belt reel blocks the relative rotation which is permitted between the belt reel and the locking base by the belt force limiting installation and, on account thereof, deactivates the belt force limiting installation.

A substantial advantage of the belt retractor according to the invention is to be seen in that in the case thereof, after a predefined maximum relative rotary angle between the locking base and the belt reel, blocking of the belt force limiting automatically arises and the belt reel is blocked by the locking base. In this way, it may be advantageously avoided that an excessively long extraction of the belt may arise during the belt force limiting phase.

It is seen as advantageous when the deactivation installation has an auxiliary element which during relative rotation between the belt reel and the locking base and being indirectly or directly driven by the rotation of the belt reel carries out radial motion or at least also carries out radial motion, wherein radial motion, when viewed from the rotation axis of the belt reel, is understood to be an outward motion away from the rotation axis or an inward motion in the direction of the rotation axis.

Preferably, the auxiliary element during relative rotation between the belt reel and the locking base and being driven by the rotation of the belt reel, additionally to radial motion, also carries out rotary motion in relation to the locked locking base.

It is advantageous when the auxiliary element forms a gear element which during relative rotation between the belt reel and the locking base is conjointly rotated with the belt reel in the same rotation direction or in a rotation direction counter thereto but at a rotation speed which is less than that of the belt reel, on account of which during relative rotation between the belt reel and the locking base a torsion angle between the auxiliary element and the locking base, which is smaller than the respective relative rotary angle between the belt reel and the locking base, is generated.

Preferably, the auxiliary element which preferably forms part of an eccentric gear has a stop which contacts a stop on the locking base when the torsion angle between the auxiliary element and the locking base reaches a predefined maximum torsion angle.

It is also advantageous when the auxiliary element has an external toothing which interacts with an internal toothing which is disposed on the locking base or on the belt reel, and which external toothing upon rotary and radial motion thereof and while performing a tumbling motion is in each case supported only on a part-portion of the internal toothing.

The auxiliary element is preferably mounted on the locking base or on the belt reel so as to be rotatable yet eccentric or offset, respectively, to the rotation axis of the belt reel and during the relative rotation between the belt reel and the locking base preferably carries out rotary motion which is eccentric in relation to the rotation axis of the belt reel.

In one preferred variant of embodiment it is provided that the auxiliary element has an external toothing which interacts with an internal toothing which is disposed on the locking base and is mounted on the belt reel so as to be rotatable yet eccentric or offset, respectively, in relation to the rotation axis of the belt reel.

In another preferred variant of embodiment it is provided that the auxiliary element has an external toothing which interacts with an internal toothing which is disposed on the belt reel and which is mounted on the locking base so as to be rotatable yet eccentric or offset, respectively, in relation to the rotation axis of the belt reel.

Preferably, the auxiliary element has at least one lug which extends axially and specifically parallel with the axis of the belt retractor in the direction of the locking base and which engages in an assigned depression in the locking base and during the radial and rotary motion of the auxiliary element is moved in the depression, wherein the auxiliary element itself blocks the relative rotation which is permitted between the belt reel and the locking base by the belt force limiting installation as soon as the lug impacts on an external periphery of the depression.

Alternatively or additionally, it may be provided that the auxiliary element has at least one stop which radially extends outward in the direction of the locking base which during the radial and rotary motion of the auxiliary element contacts a stop of the locking base that extends radially inward in the direction of the auxiliary element as soon as relative rotation between the belt reel and the locking base reaches the predefined maximum relative rotary angle.

A design embodiment is also advantageous in which it is provided that the auxiliary element has at least one through hole which during the radial and rotary motion of the auxiliary element is torsioned in relation to the belt reel, and a blocking element, which is spring-loaded by a spring and which prior to relative rotation between the belt reel and the locking base is supported on the auxiliary element and is separated by the latter from the locking base, is held by the auxiliary element in the belt reel, wherein the blocking element is pushed through the through hole in the auxiliary element by the spring force of the spring as soon as, on account of the auxiliary element being torsioned in relation to the belt reel and in relation to the locking base, the blocking element and the through hole are mutually aligned. Preferably, the locking base has a depression into which the blocking element can be pushed; in the case of such a design embodiment the blocking element is pushed through the through hole in the auxiliary element into the depression in the locking base by the spring force of the spring as soon as, on account of the auxiliary element being torsioned in relation to the belt reel and in relation to the locking base, the blocking element, the through hole, and the depression in the locking base are mutually aligned.

In another design embodiment seen as preferable it is provided that the auxiliary element is guided in a helical depression in the locking base or in the belt reel, and is displaceable in the helical depression, and the auxiliary element prior to relative rotation between the belt reel and the locking base has such a radial spacing from the rotation axis of the belt reel that the auxiliary element prevents deactivation of the belt force limiting installation.

With a view to relative rotation between the belt reel and the locking base being terminated in a particularly simple manner, it is seen as advantageous when a blocking element, which is spring-loaded by a spring and which prior to relative rotation between the belt reel and the locking base is supported on the auxiliary element and is separated by the latter from the locking base, is held in the belt reel; the auxiliary element is guided in a helical depression in the locking base, and is displaceable in the helical depression; and the auxiliary element prior to relative rotation between the belt reel and the locking base has such a radial spacing from the rotation axis of the belt reel that the auxiliary element at least in portions closes a depression in the locking base; wherein during rotation of the belt reel in relation to the locked locking base the blocking element displaces the auxiliary element in the helical depression and, on account thereof, modifies the radial spacing of the auxiliary element from the rotation axis of the belt reel and thus from the depression in the locking base; and wherein the blocking element is pushed past the auxiliary element or through the auxiliary element into the depression in the locking base by way of the spring force of the spring as soon as the radial spacing of the auxiliary element permits this and the blocking element and the depression in the locking base are mutually aligned.

Alternatively or additionally, it may be provided that the auxiliary element is formed by a pivotable latch which interacts with a worm drive of the deactivation installation and which after having been pivoted by the worm drive deactivates the belt force limiting installation.

In the case of the last-mentioned variant it is advantageous when the worm drive has a pitched drive rod which is connected to the locking base, and an actuator element which is held in the belt reel so as to be axially displaceable and which is linked to the pitched drive rod and in the case of relative rotation between the belt reel and the pitched drive rod is pushed out of the belt reel and in the direction of the latch, on account of which the latch when reaching the predefined maximum relative rotary angle between the locking base and the belt reel is pivoted by the actuator element and deactivates the belt force limiting installation.

Moreover, it is advantageous when the latch after reaching the predefined maximum relative rotary angle between the locking base and the belt reel is pivoted into an internal toothing of a locking gear wheel which is fixed to the frame or into an internal toothing in the locking base and, on account thereof, connects the belt reel to the locking base in a rotationally fixed manner.

Preferably, the actuator element has a slope which upon axial displacement of the actuator element strikes the latch and pivots the latter based on the principle of force deflection on an inclined plane.

Alternatively or additionally, it may be provided that the belt retractor has a freewheeling gear which operates in a rotary-angle-dependent manner and which deactivates the belt force limiting installation as soon as the freewheeling gear has been rotated about a predefined maximum rotary freewheeling angle.

Preferably, the freewheeling gear has at least one rotary element which during freewheeling of the freewheeling gear is rotated by the belt reel.

In order to enable two or more relative revolutions between the locking base and the belt reel in a particularly simple manner, it is seen as advantageous when the freewheeling gear has a first rotary element and at least one second rotary element which is downstream of the first rotary element, wherein in a first phase of freewheeling the first rotary element is initially rotated in relation to the second rotary element until a stop of the first rotary element contacts a stop of the second rotary element and the first rotary element subsequently conjointly rotates the second rotary element.

It is advantageous in the case of a plurality of relative revolutions being desired when the freewheeling gear has two or more rotary elements which during relative rotation between the belt reel and the locking base are conjointly rotated in a cascading manner until the last rotary element in the cascade contacts a stop on the locking base and, on account thereof, relative rotation between the locking base and the belt reel is blocked and the belt force limiting installation is deactivated.

In respect of linking the rotary elements it is seen as advantageous when in each case one guide groove is disposed on one side of the first and second rotary element, and in each case one control element is disposed on the other side of the first and second rotary element, wherein the control element of one of the rotary elements engages in the guide groove of the other rotary element, and the control element of the other rotary element engages in the guide groove of another part of the belt retractor.

In the case of the last-mentioned variant it is advantageous when the control element of the second rotary element is guided in a guide groove of the first rotary element, and the control element of the first rotary element is guided in a guide groove in the belt reel.

A design embodiment in which the rotary element or one of the rotary elements holds a blocking element, which is spring-loaded by a spring and which prior to relative rotation between the belt reel and the locking base is supported on this rotary element and is separated by the latter from the locking base, in the belt reel, wherein the blocking element is pushed through a through hole in the rotary element or is pushed past the rotary element by the spring force of the spring as soon as this is possible on account of the belt reel being torsioned, in particular as soon as on account of the belt reel being torsioned in relation to the rotary element the blocking element and the through hole are mutually aligned, is also seen as advantageous.

Preferably, the blocking element is pushed through the through hole in the rotary element or in one of the rotary elements into a depression in the locking base by means of the spring force of the spring as soon as on account of the belt reel being torsioned in relation to the locking base the blocking element, the through hole in the rotary element, and the depression in the locking base are mutually aligned.

In order to enable two or more relative revolutions between the locking base and the belt reel in a particularly simple manner, it is seen as advantageous when the freewheeling gear has two or more rotary elements, and the blocking element is pushed through the through hole in one of the rotary elements onto a downstream rotary element by means of the spring force of the spring as soon as the through hole in the upstream rotary element and the blocking element are mutually aligned.

Preferably, the blocking element is pushed through the through hole in the last rotary element in the cascade of rotary elements into a depression in the locking base by means of the spring force of the spring as soon as on account of the belt reel being torsioned in relation to the locking base the blocking element, the through holes in all rotary elements of the cascade, and the depression in the locking base are mutually aligned.

The invention will be explained in more detail hereunder by means of exemplary embodiments. In the figures in an exemplary manner:

FIGS. 1-6 show a first exemplary embodiment for a belt retractor according to the invention;

FIGS. 17-19 show a fifth exemplary embodiment for a belt retractor according to the invention; and FIGS. 20-24 show a sixth exemplary embodiment for a belt retractor according to the invention.

The same reference signs are used for identical or comparable components of the same exemplary embodiment in the figures.

FIGS. 1 to 6 show component parts of a first exemplary embodiment for a belt retractor. A belt reel 100 for winding up a safety belt (not shown for reasons of clarity) can be seen. A locking base 120 which during normal operation is conjointly rotated with the belt reel 100 and the rotary motion of which upon abrupt belt extraction is locked by means of a locking mechanism of the locking base 120 interacts with the belt reel 100.

The belt retractor moreover has a belt force limiting installation (likewise not shown in FIG. 1 for reasons of clarity) which may be a torsion bar which is disposed within the belt reel 100, for example. The belt force limiting installation serves for permitting relative rotation between the belt reel 100 and the locking base 120 when the locking base 120 is locked.

Figure 1:
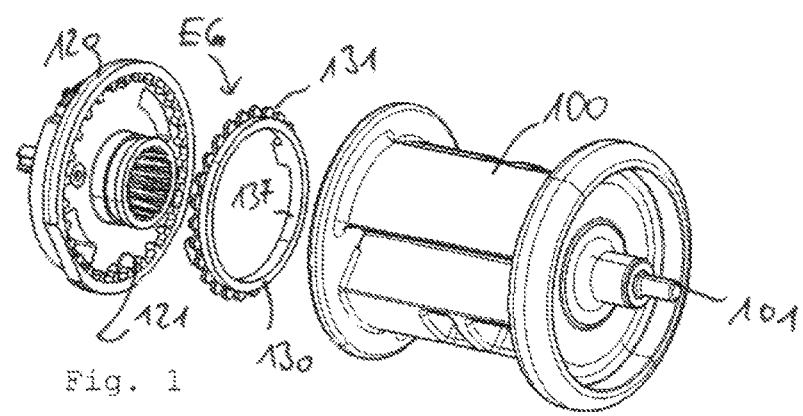

FIG. 1 moreover shows an auxiliary element in the form of a gear element 130 which is equipped with an external toothing 131. The external toothing 131 of the gear element 130 collaborates with an internal toothing 121 of the locking base 120. The gear element 130 forms a component part of an eccentric gear EG of which the operating mode will be set forth herebelow.

Figure 2:
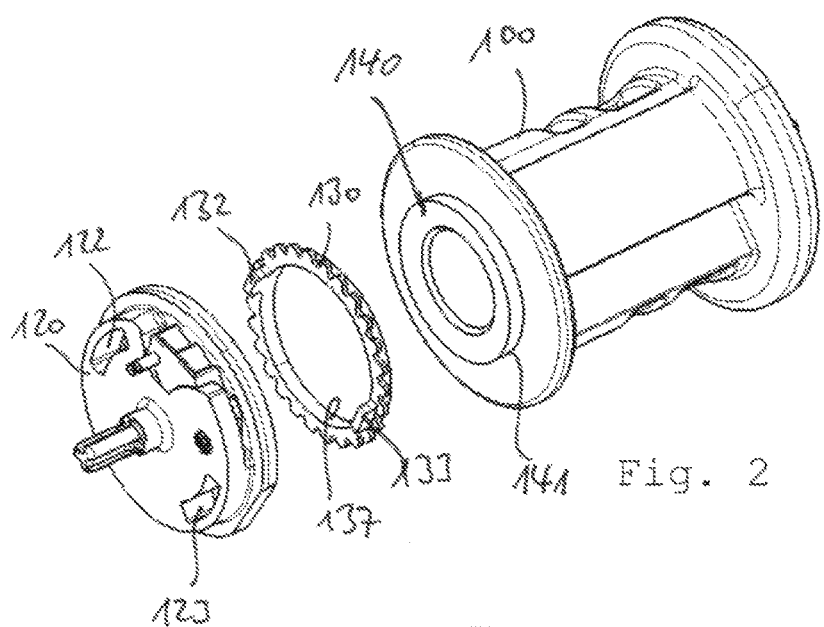

FIG. 2 shows the belt reel 100, the gear element 130, and the locking base 120 according to FIG. 1 in another view. A bearing ring 140 which is attached to the belt reel 100 or is integrally molded thereon can be seen. The bearing ring 140 has a circular external contour 141 and is disposed so as to be eccentric in relation to the rotation axis 101 of the belt reel 100. In other words, the center of the bearing ring 140 is offset in relation to the rotation axis 101.

The gear element 130 is designed as an annular gear having a circular through hole 137 and is push-fitted onto the bearing ring 140. The gear element 130 may be rotated on the bearing ring 140 or be rotated in relation to the latter, respectively.

FIG. 2 moreover shows two stops in the form of lugs 132 and 133 which extend in an axial manner and specifically parallel with the rotation axis 101 of the belt reel 100, and engage in depressions 122 and 123 which may be through holes, for example, in the locking base 120. The size of the depressions 122 and 123 in the locking base 120 is larger than that of the lugs 132 and 133, such that a certain relative rotation is possible between the gear element 130 and the locking base 120.

Figure 3:
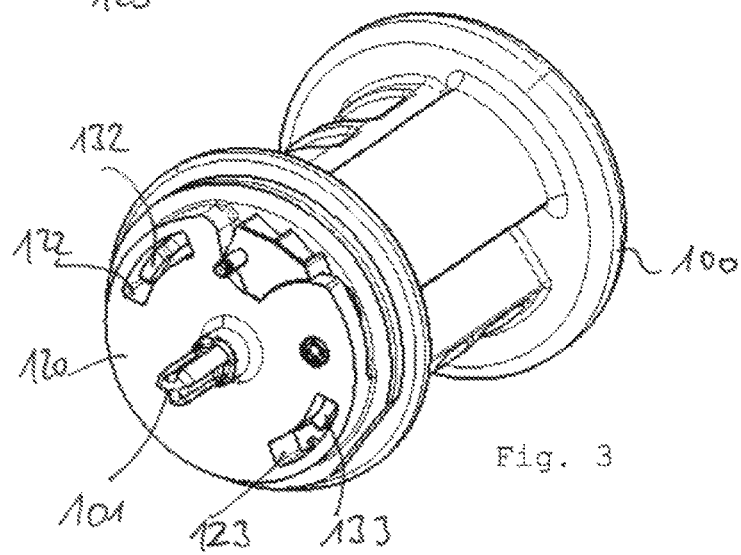

FIG. 3 shows the belt reel 100, the locking base 120, and the gear element 130 in the assembled state. The two lugs 132 and 133 which are pushed into the depressions 122 and 123 can be seen. Since the depressions 122 and 123 in the exemplary embodiment according to FIGS. 1 to 5 are through holes, the two lugs 132 and 133 can be seen from outside in the illustration according to FIG. 3.

FIG. 4 shows in more detail the arrangement of the gear element 130 on the bearing ring 140 and thus on the belt reel 100. It can be seen that the gear element 130 in relation to the rotation axis 101 is mounted on the bearing ring 140 so as to be eccentric.

It can moreover be seen in FIG. 4 that the external diameter of the gear element 130 or the external diameter of the external toothing 131, respectively, is smaller than the internal diameter of the locking base 120 in the region of the internal toothing 121. On account of this sizing it is possible that the gear element 130 upon relative rotation of the belt reel 100 about the rotation axis 101 in relation to the locking base 120 carries out a rotary motion or a rotation motion, respectively, along the direction of the arrow D and additionally radial motion along the direction of the arrow R. Radial motion along the direction of the arrow R is understood to be a motion in which the gear element 130, when viewed from the rotation axis 101 of the belt reel 100, is moved outward away from the rotation axis 101 or inward in the direction of the rotation axis 101.

In the case of relative rotation of the belt reel 100 in relation to the locking base 120 a tumbling motion of the gear element 130 thus takes place in which the gear element 130 in relation to the rotation axis 101 of the belt reel 101 moves in a rotary and radial manner and in each case only a part-portion of the external toothing 131 of the gear element 130 is supported on the internal toothing 121 of the locking base 120. On account of this tumbling motion of the gear element 130 it is possible for the gear element 130 during relative rotation between the belt reel 100 and the locking base 120 to be conjointly rotated counter to the rotation direction of the belt reel 100 and specifically at a rotation speed which is smaller than that of the belt reel 100; on account thereof, during relative rotation between the belt reel 100 and the locking base 120 a torsion angle between the gear element 130 and the locking base 120, which is smaller than the respective relative rotary angle between the belt reel 100 and the locking base 120, is generated.

On account of relative rotation between the gear element 130 and the locking base 120, a relative motion of the two lugs 132 and 133 within the depressions 122 and 123 arises until the lugs contact stops which are formed by the periphery of the depressions. As soon as the lugs 132 and 133 reach the respective end or the respective periphery of the assigned depression 122 and 123, respectively, relative rotation between the gear element 130 and the locking base 120 is blocked, such that complementary blocking of relative rotation between the belt reel 100 and the locking base 120 also arises.

The gear element 130 which is mounted on the bearing ring 140 and may carry out relative rotation both in relation to the belt reel 100 as well as to the locking base 120 thus forms a deactivation installation or at least a component part of a deactivation installation for the belt retractor, which after a predefined maximum relative rotary angle blocks the relative rotation which is permitted between the belt reel 100 and the locking base 120 by the belt force limiting installation and, on account thereof, deactivates the belt force limiting installation. In the case of the exemplary embodiment the maximum relative rotary angle is defined by the size of the two depressions 122 and 123.

FIG. 5 shows the two lugs 132 and 133 of the gear element 130 and the relative position of the former within the depressions 122 and 123 of the locking base 120 once again, in another view.

FIG. 6 shows a potential alternative design embodiment of the gear element 130 and of the internal toothing 121 of the locking base 120. A stop 134 of the gear element 130, which interacts with a stop 124 in the region of the toothing 121 or of the locking base 120, can be seen. Should relative rotation between the gear element 130 and the locking base 120 arise in the context of the above-described tumbling motion of the gear element 130, the stop 134 of the gear element 130, upon passing a predefined maximum relative rotary angle, will contact the stop 124 of the locking base 120, thus blocking relative rotation between the gear element 130 and the locking base 120. Otherwise, the explanations made above in the context of FIGS. 1 to 5 apply in a corresponding manner.

Figure 7:
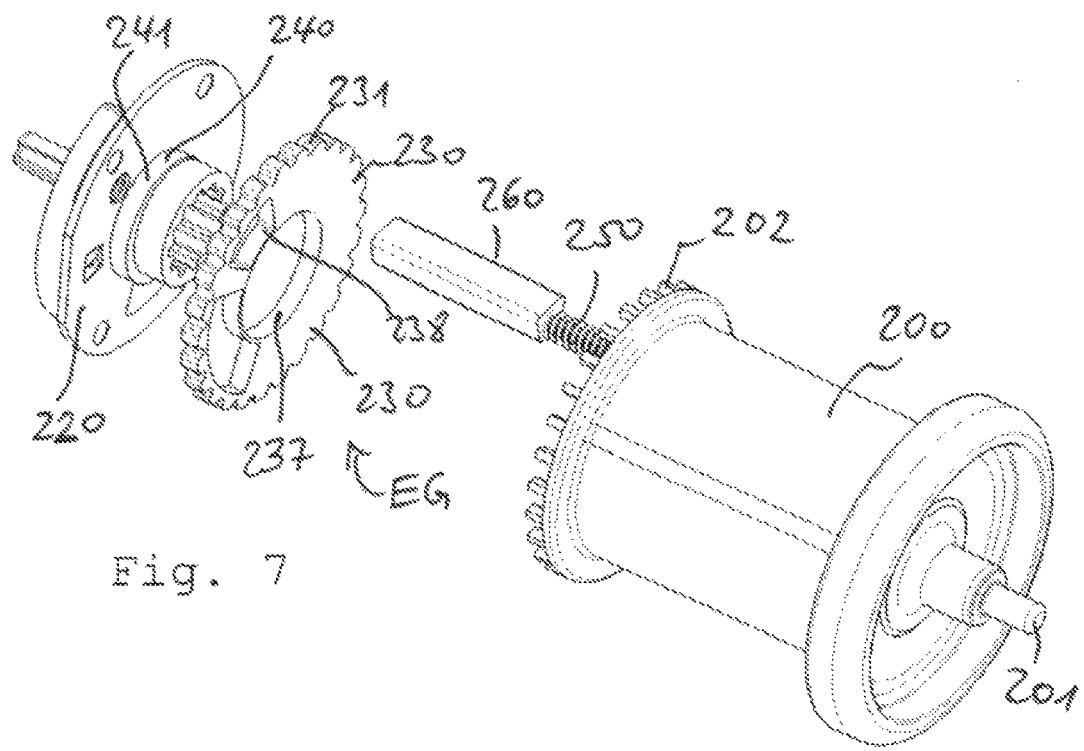
FIGS. 7-10 show a second exemplary embodiment for a belt retractor according to the invention.

FIG. 7 shows component parts of a second exemplary embodiment for a belt retractor having a deactivation installation. To be seen are a belt reel 200, a locking base 220, and an auxiliary element in the form of a gear element 230 which when viewed in the axial direction or along the rotation axis 201 of the belt reel 200, respectively, in spatial terms is disposed between the locking base 220 and the belt reel 200. The gear element 230 forms a component part of an eccentric gear EG, the operating mode of which will be set forth herebelow.

The gear element 230 has a circular through hole 237 by way of which the gear element 230 is push-fitted onto a bearing ring 240 having a circular external contour 241. The bearing ring 240 may be attached to the locking base 220 or be integrally molded thereon. The center of the circular bearing ring 240 is disposed so as to be eccentric in relation to the rotation axis 201 of the belt reel 200, such that the gear element 230 is also mounted so as to be eccentric in relation to the rotation axis 201 of the belt reel 200.

Figure 8:
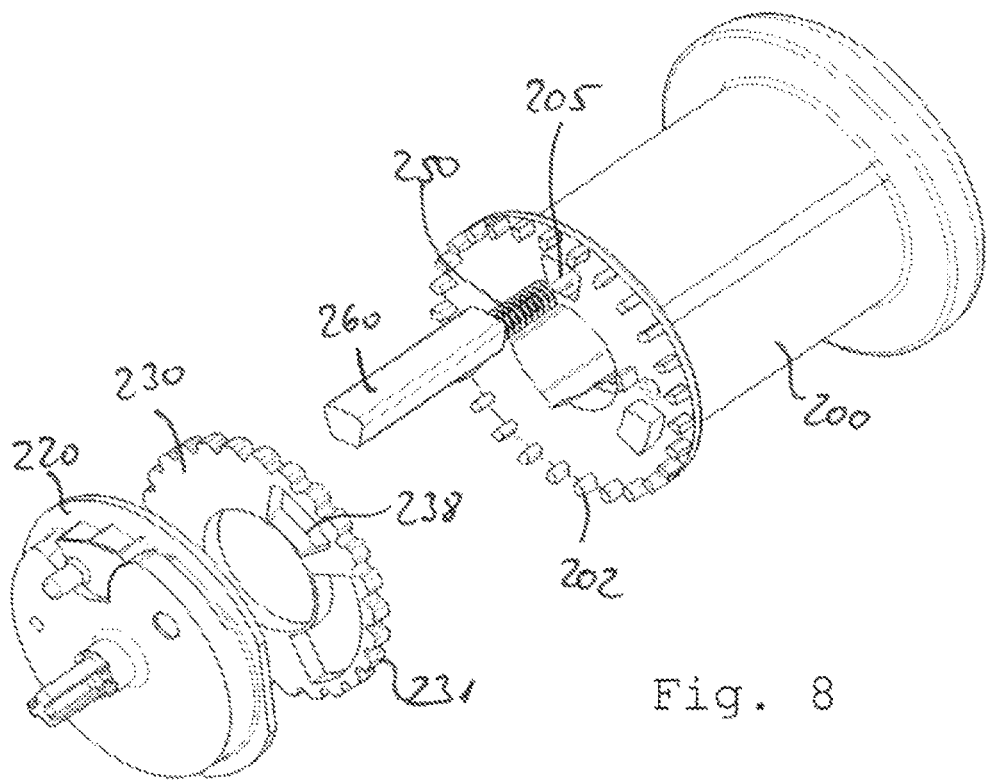

FIG. 7 moreover shows a spring 250 and a blocking element 260, both being pushed into a receptacle stud hole 205 (cf. FIG. 8). The spring 250 causes spring loading of the blocking element 260 and a force which attempts to urge the blocking element 260 in the axial direction out of the receptacle stud hole 205 or out of the belt reel 200, respectively.

The gear element 230 has an external toothing 231 which interacts with an internal toothing 202 of the belt reel 200. The diameter of the external toothing 231 of the gear element 230 is smaller than the internal diameter of the internal toothing 202, such that the gear element 230 can carry out a tumbling motion in the interior of the internal toothing 202, as has been set forth in an exemplary manner already in the context of the gear element 130 in the case of the exemplary embodiment according to FIGS. 1 to 6.

FIG. 8 shows the components according to FIG. 7 in another view. The receptacle stud hole 205 in the belt reel 200, into which the spring 250 and the blocking element 260 have been pushed, can be seen. Moreover, the gear element 230 can also be seen, which in the initial position prior to relative rotation is aligned between the locking base 220 and the belt reel 200 in such a manner that the blocking element 260 can be supported on the gear element 230.

Also to be seen in FIG. 8 is a through hole 238 in the gear element 230, through which the blocking element 260 may slide in the direction of the locking base 220 once the gear element 230 upon relative rotation between the belt reel 200 and the locking base 220 has been relatively rotated to a sufficient extent.

Figure 9:
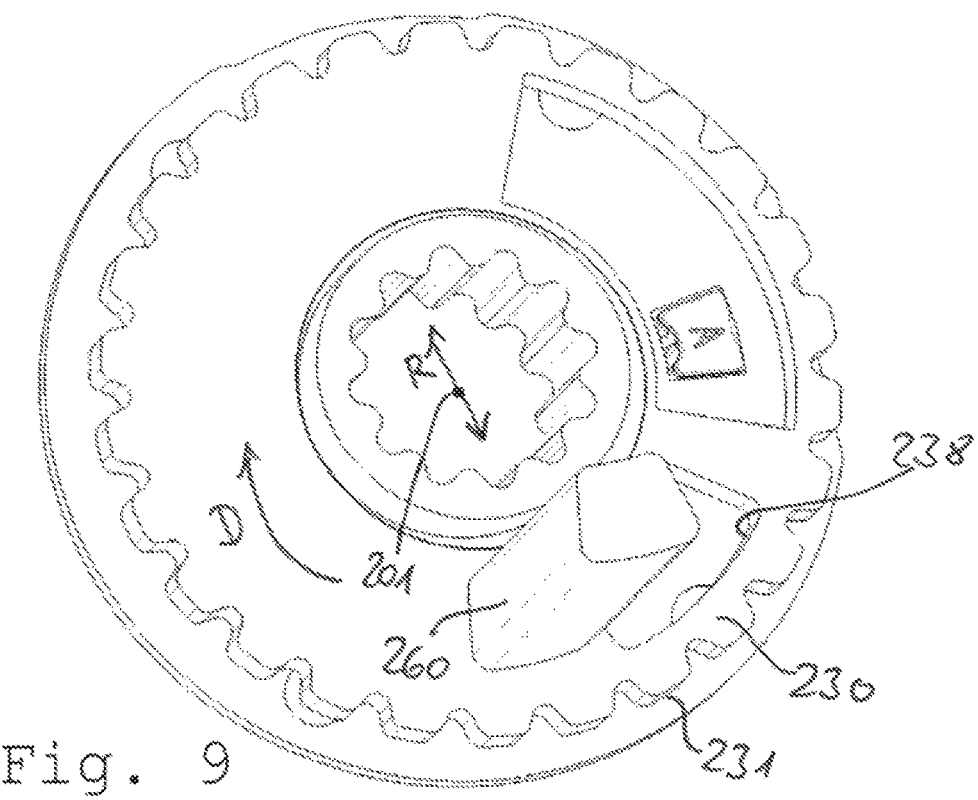

FIG. 9 shows the arrangement of the gear element 230 in relation to the blocking element 260 prior to commencement of relative rotation between the belt reel 200 and the locking base 220. It can be seen that the blocking element 260 bears on the gear element 230 or is supported on the latter, respectively. In other words, the gear element 230 in spatial terms separates the blocking element 260 from the locking base 220.

Should relative rotation between the belt reel 200 and the locking base 220 arise after the locking base 220 has been locked in the context of belt force limitation, the internal toothing 202 of the belt reel 200 will drive the gear element 230 and set the latter in rotary motion along the rotation direction D and in radial motion along the direction of the arrow R, that is to say radial in relation to the rotation axis 201, such that the gear element 230 carries out a tumbling motion and is conjointly rotated with the belt reel 200 in the same rotation direction as the belt reel 200, however at a rotation speed which is smaller than that of the belt reel 200.

Figure 10:
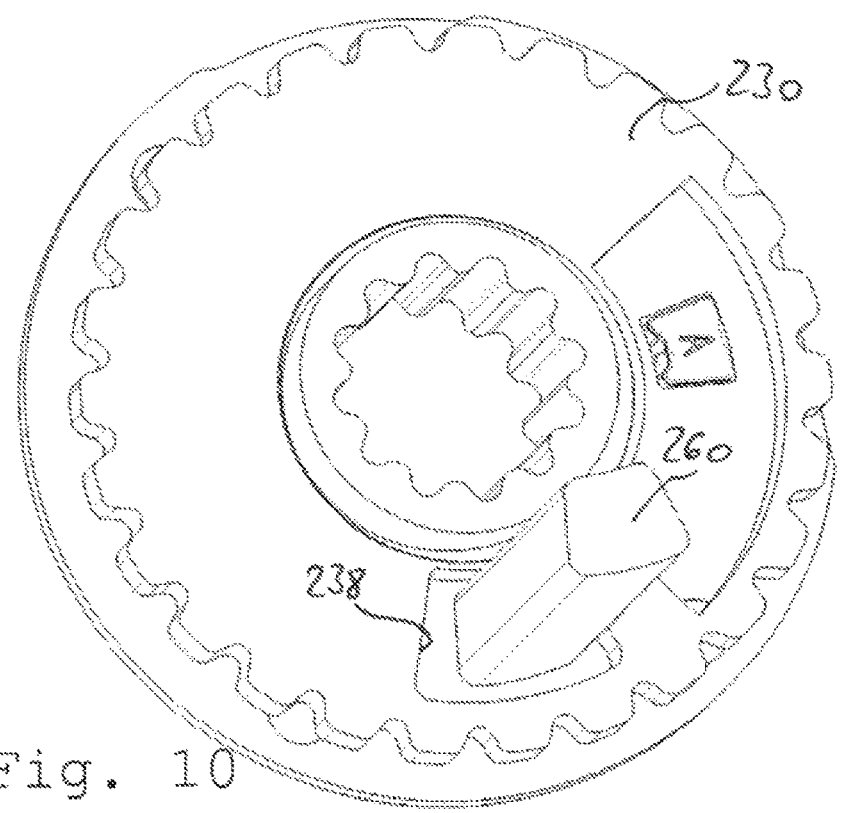

On account of the lower rotation speed of the gear element 230, and depending on the gearing of the gear formed by the external toothing 231 and the internal toothing 202, after a predefined number of relative rotations of the belt reel 200 in relation to the locking base 220 a rotary angle between the gear element 230 and the belt reel 200 arises in such a manner that the through hole 238 in the gear element 230 and the blocking element 260 are mutually superimposed. As soon as the blocking element 260 is mutually aligned with the through hole 238 in the gear element 230, the blocking element 260 driven by the spring 250 is pushed through the through hole 238 (cf. FIG. 10), on account of which further relative rotation between the gear element 230 and the belt reel 200 is eliminated. By way of locking relative rotation of the gear element 230 in relation to the belt reel 200, the gear element 230 is locked, on account of which blocking between the locking base 220 and the belt reel 200 consequently arises and, on account thereof, in turn deactivation of the belt force limiting installation arises.

Preferably, a depression into which the blocking element 260, once having passed the through hole 238 in the gear element 230, may penetrate is present within the locking base 220. In such a design embodiment, the blocking element 260 after deactivation of the belt force limiting installation leads to a direct force-bearing mechanical connection between the locking base 220 and the belt reel 200. In the absence of such a depression the gear element 230 would be force-bearing and would alone lock the locking base 220 and the belt reel 200.

Figure 11:
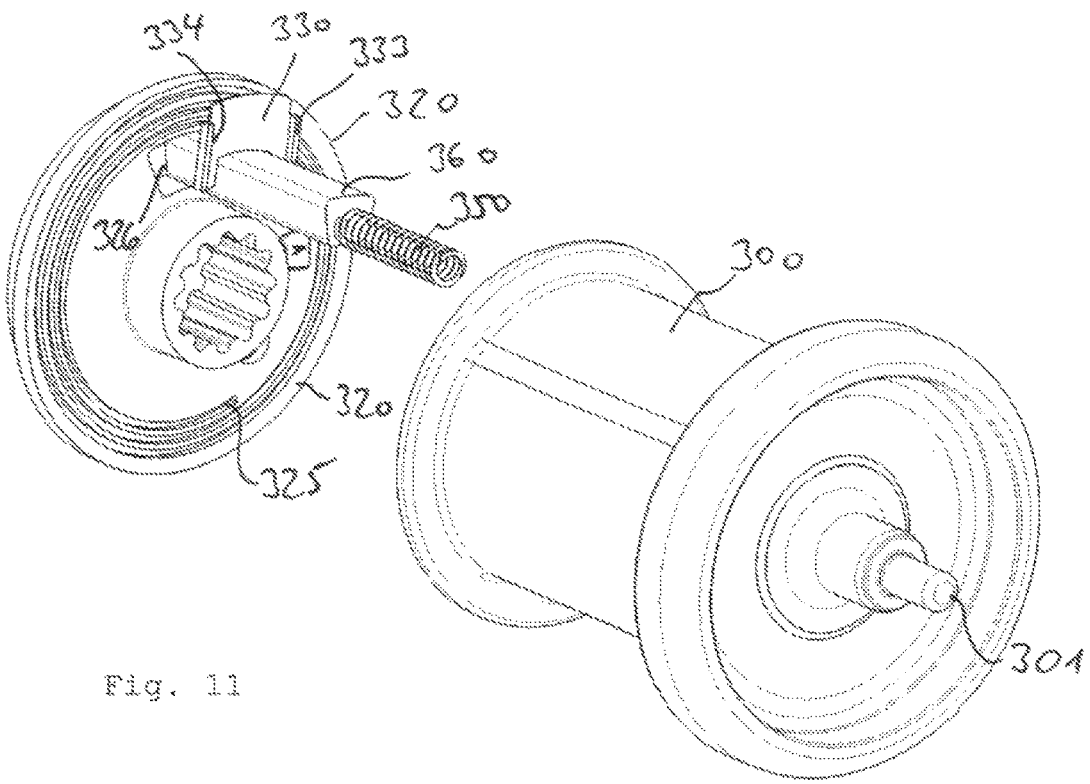
FIGS. 11-14 show a third exemplary embodiment for a belt retractor according to the invention.

FIG. 11 shows component parts of a third exemplary embodiment for a belt retractor. A belt reel 300 and a locking base 320 which during normal operation is conjointly rotated with the belt reel 300 and the rotary motion of which upon abrupt belt extraction is locked by means of a locking mechanism of the locking base 320 can be seen. A belt force limiting installation which may be a torsion bar which is disposed within the belt reel 300, for example, is not shown in FIG. 11 for reasons of clarity.

A deactivation installation which after a predefined maximum relative rotary angle between the locking base 320 and the belt reel 300 blocks the belt force limiting installation in the exemplary embodiment according to FIG. 11 comprises an auxiliary element 330, a spring 350, and a blocking element 360. The auxiliary element 330 is guided in a helical depression 325 (preferably in the form of a groove) of the locking base 320.

The spring 350 and the blocking element 360 are accommodated in a receptacle stud hole 305 (cf. FIG. 12) which extends in the axial direction or along the rotation axis 301 of the belt reel, respectively, and is spaced apart from the rotation axis 301.

Figure 12:
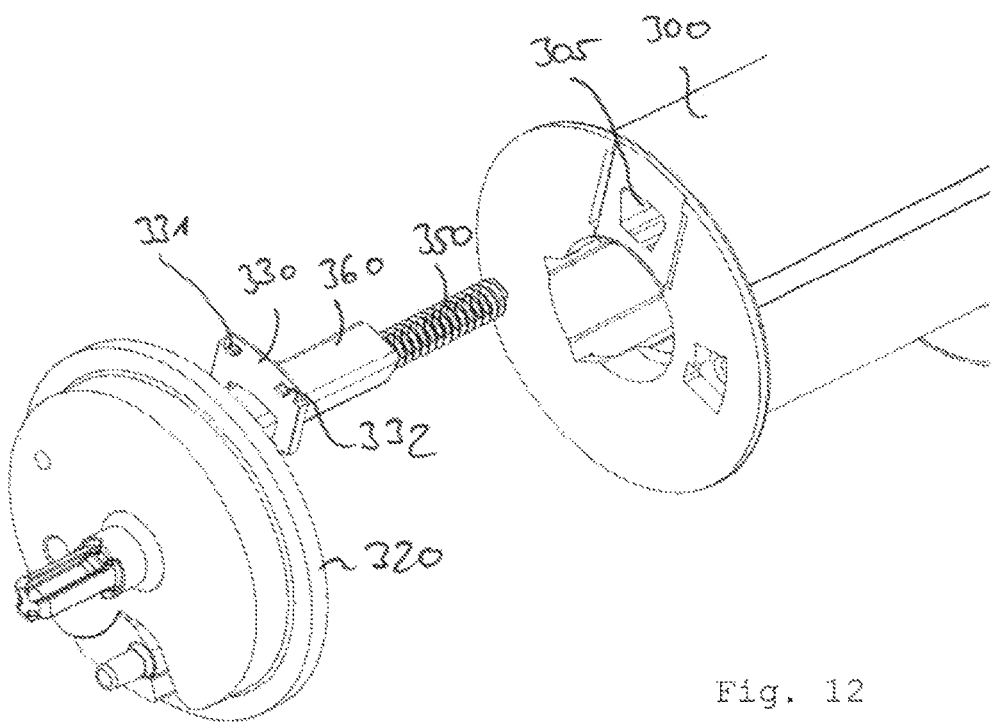

FIG. 12 shows two sliding lugs 331 and 332 of the auxiliary element 330 which are push-fitted into the helical depression 325, guiding the auxiliary element 330 in the helical depression 325. As mentioned above, the helical depression 325 is preferably a helical groove.

The auxiliary element 330 moreover has two lateral support peripheries 333 and 334 (cf. FIG. 11) which interact with the blocking element 360.

In the initial position prior to activation of the belt force limiting installation and prior to relative rotation between the belt reel 300 and the locking base 320, the blocking element 360 is supported on the auxiliary element 330, such that the former is separated by the auxiliary element 330 from a depression 326 in the locking base 320.

Should relative rotation arise between the belt reel 300 and the locked locking base 320 in the context of limiting the belt force, the blocking element 360 will contact the support periphery 333 of the auxiliary element 330 and torsion the auxiliary element 330 in the helical depression 325. By rotating the auxiliary element 330 the latter is moved in rotary motion along the direction of the arrow D and in outward radial motion along the direction of the arrow R, that is to say away from the rotation axis 301 of the belt reel 300. On account of rotary motion along the direction of the arrow D and radial motion along the direction of the arrow R, the spacing of the auxiliary element 330 from the rotation axis 301 increases. This is to be set forth in more detail in the context of FIGS. 13 and 14.

Figure 13:
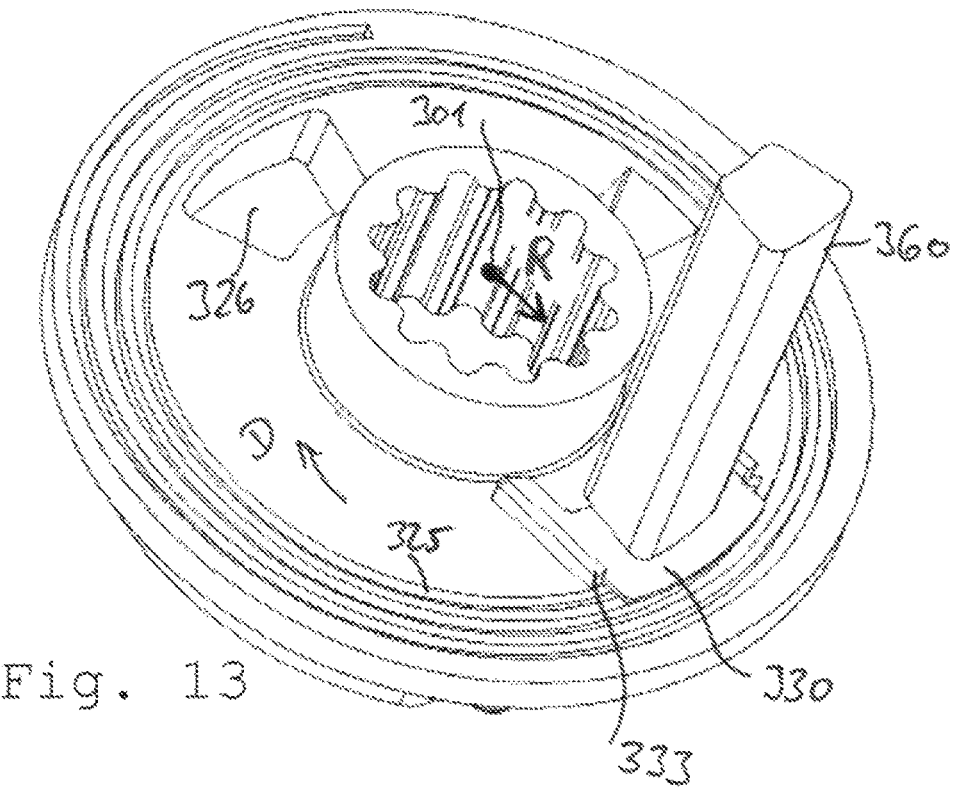

FIG. 13 shows the blocking element 360 and the locking base 320 in the initial state, that is to say prior to relative rotation between the belt reel 300 and the locking base 320. It can be seen that the blocking element 360 is supported on the auxiliary element 330 and is thus separated from the locking base 320 by the auxiliary element 330. Should the blocking element 360 in the context of relative rotation between the belt reel 300 and the locking base 320 now conjointly move with the belt reel 300 along the direction of the arrow D, the auxiliary element 330 is moved radially outward along the direction of the arrow R, on account of which radial relative motion between the auxiliary element 330 (traveling in a radially outward manner) and the (radially stationary) blocking element 360 arises.

Figure 14:
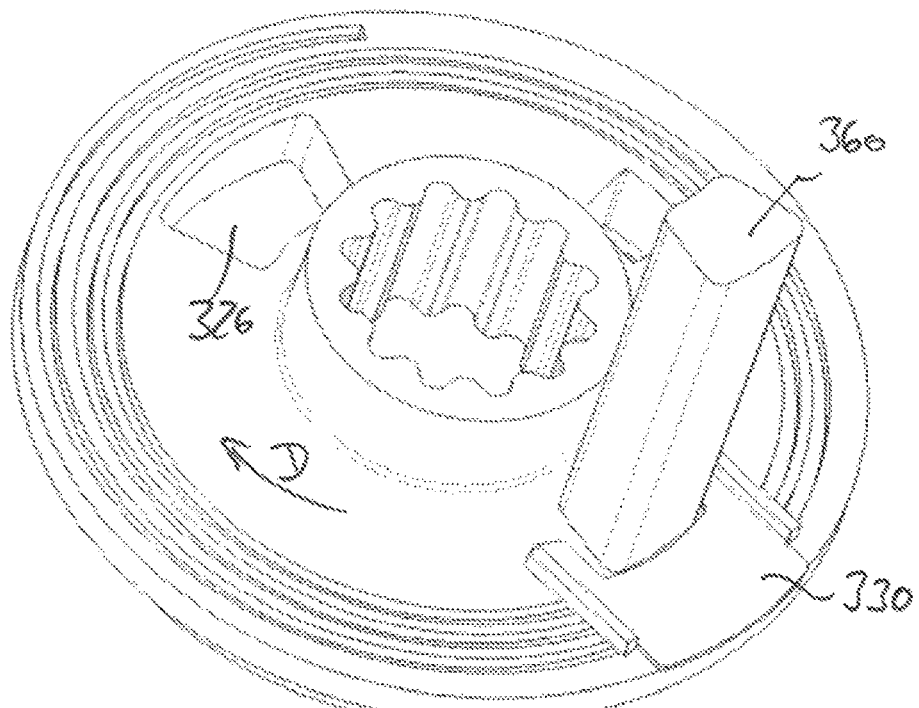

FIG. 14 shows an intermediate state in which, on account of outward radial motion of the auxiliary element 330, the auxiliary element 330 has already been separated from the blocking element 360, and the blocking element 360 may glide in the direction of the locking base 320. On account of the separation of the auxiliary element 330, the blocking element 360, upon further relative rotation of the belt reel 300 in relation to the locking base 320, now has the opportunity to glide into the depression 326 and to thus establish a rotationally fixed connection between the belt reel 300 and the locking base 320.

In summary, the helical depression 325, the depression 326 in the locking base 320, the auxiliary element 330, the blocking element 360, the spring 350, and the receptacle stud hole 305 form a deactivation installation which may block a belt force limiting installation of the belt retractor after a predefined maximum relative rotary angle between the locking base 320 and the belt reel 300.

Figure 15:
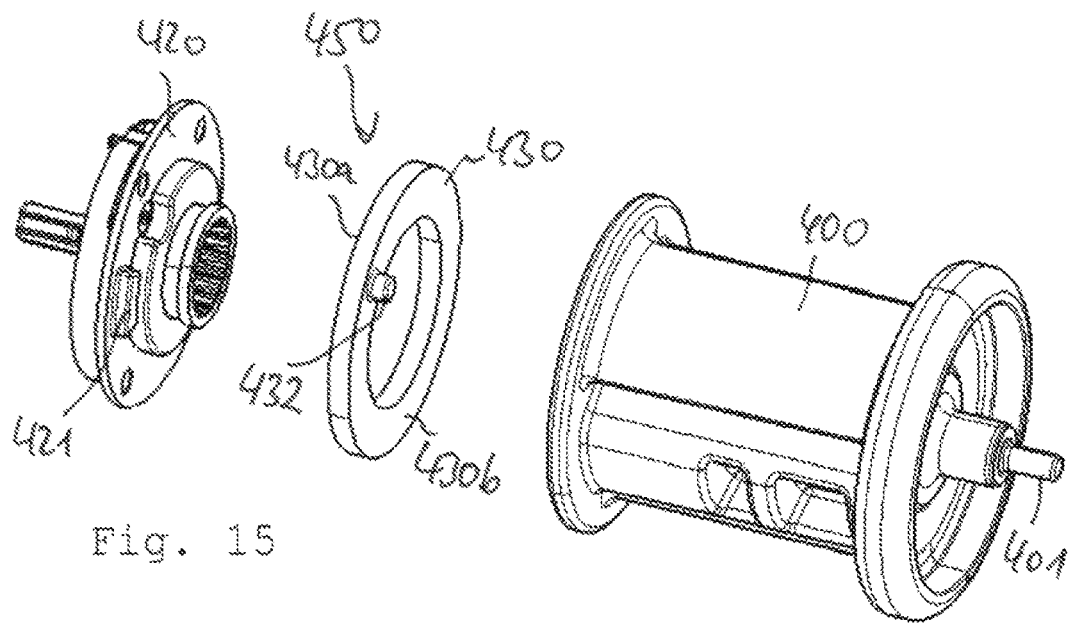
FIGS. 15-16 show a fourth exemplary embodiment for a belt retractor according to the invention.

FIG. 15 shows component parts of a fourth exemplary embodiment for a belt retractor for a safety belt. To be seen are a belt reel 400, a locking base 420, and a rotary element 430.

Figure 16:
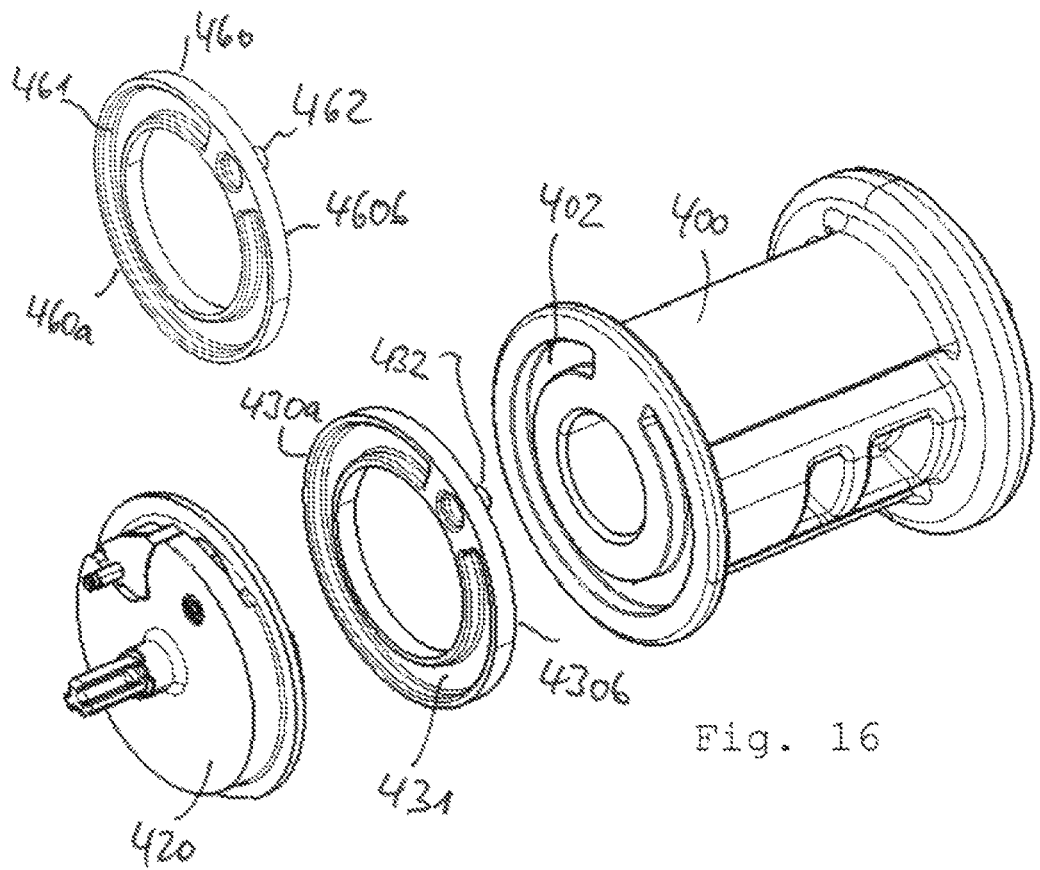

FIG. 16 shows the component parts according to FIG. 15 in another view. It can be seen that the rotary element 430 on one side 430a is equipped with a guide groove 431, and on the other side 430b is equipped with a guide element 432. The guide element 432 is preferably formed by a lug which extends axially to or parallel with the rotation axis 401 of the belt reel, respectively, and is spaced apart therefrom. The guide element 432 of the rotary element 430 engages in a guide groove 402 of the belt reel 400.

A guide element 421 (cf. FIG. 15), which is preferably integrally molded on the locking base 420 and which, so as to be spaced apart from the rotation axis 401 of the belt reel 400, extends in an axial direction in the direction of the belt reel 400, engages in the guide groove 431 of the rotary element 430.

The guide element 421 in the locking base 420, the rotary element 430, and the guide groove 402 in the belt reel 400 form a freewheeling gear 450 which in the case of relative rotation between the belt reel 400 and the locking base 420 in the context of belt force limitation operates as a deactivation installation which after a predefined maximum relative rotary angle between the locking base 420 and the belt reel 400 blocks further relative rotation and, on account thereof, deactivates the belt force limiting installation.

The freewheeling gear 450 operates as follows:

Should relative rotation of the belt reel 400 in relation to the locked locking base 420 arise, the guide groove 402 in the belt reel 400 is initially moved in relation to the as yet stationary guide element 432 of the rotary element 430. Should the end of the guide groove 402 of the belt reel 400 contact the guide element 432 of the rotary element 430, the rotary element 430 is also subsequently and conjointly moved. Conjoint rotation of the rotary element 430 is possible since the guide groove 431 in the rotary element 430 may rotate in relation to the guide element 421 in the stationary locking base 420.

As soon as the end of the guide groove 431 of the rotary element 430 contacts the guide element 421 of the locking base 420, freewheeling of the freewheeling gear 450 is terminated and the freewheeling gear 450 blocks further relative rotation between the belt reel 400 and the locking base 420.

In the exemplary embodiment according to FIGS. 15 and 16, only a single rotary element 430 is disposed between the locking base 420 and the belt reel 400. Alternatively, it may be provided that additionally one or a plurality of further rotary elements 460 which are disposed in a cascade behind one another and are conjointly and successively rotated in a cascading manner are provided between the locking base 420 and the belt reel 400.

In the case of the illustration according to FIG. 16 an additional rotary element 460 is disposed in such a manner, for example, that the guide element 421 of the locking base 420 engages in the guide groove 461 on the side 460a of the rotary element 460, and the guide element 462 which is disposed on the other side 460b of the rotary element 460 engages in the guide groove 431 of the upstream rotary element 430.

In a first phase of freewheeling by the freewheeling gear 450 the first rotary element 430 is initially rotated in relation to the second rotary element 460 until a stop (presently a periphery of the guide groove 431) of the first rotary element 430 contacts a stop (presently the guide element 462) of the second rotary element 460, and the first rotary element 430 subsequently conjointly rotates the second rotary element 460.

In a corresponding manner the freewheeling gear 450 may have further rotary elements which during relative rotation between the belt reel 400 and the locking base 420 are successively and conjointly rotated in a cascading manner until the last rotary element in the cascade contacts a stop on the locking base 420 and, on account thereof, relative rotation between the locking base 420 and the belt reel 400 is blocked and the belt force limiting installation is deactivated.

It remains to be mentioned that the arrangement of the guide grooves and guide elements may also be reversed. For example, a guide groove in the locking base 420 and a guide element in the belt reel 400 may be provided; in the case of such a design embodiment the rotary elements 430 and 460 would merely have to be assembled in the reverse order.

Figure 17:
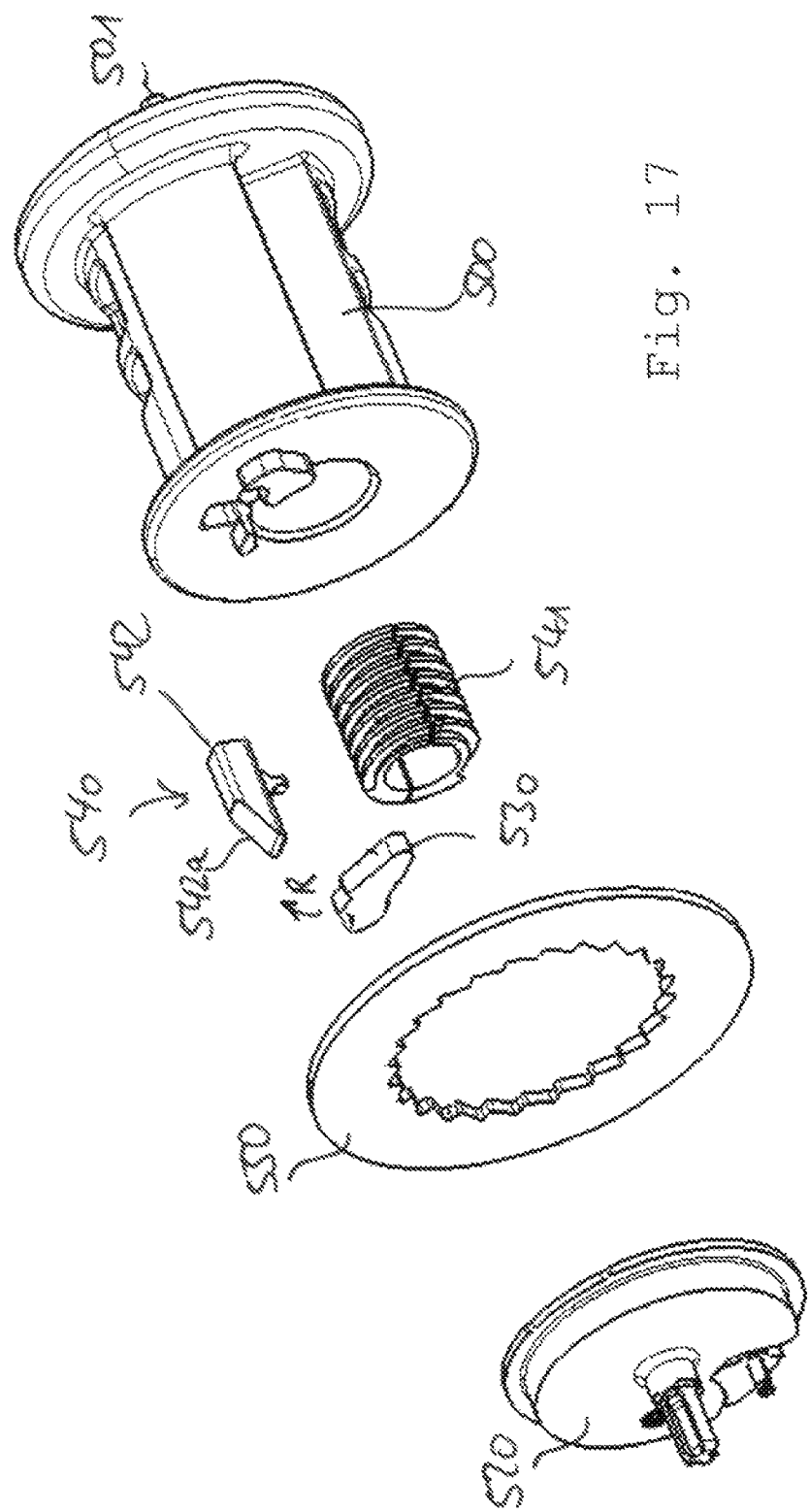

FIG. 17 shows component parts of a fifth exemplary embodiment for a belt retractor for a safety belt. A belt reel 500 and a locking base 520 can be seen.

Moreover, an auxiliary element in the form of a pivotable latch 530 can be seen. The latch 530 may be pivoted by a worm drive 540 and thus at least also be radially moved along the direction of the arrow R away from the rotation axis 501 of the belt reel 500. On account of being radially moved along the direction of the arrow R, the pivotable latch 530 may be pivoted into an internal toothing of a locking gear wheel 550 which is fixed on the frame (as shown) or alternatively into an internal toothing of a frame part of the belt retractor or into an internal toothing in the locking base 520. On account of such pivoting, the belt reel 500 and the locking base 520 may be interconnected or interlinked, respectively, in a rotationally fixed manner, such that further relative rotation between the belt reel 500 and the locking base 520 may be blocked during an active belt force limiting procedure.

Pivoting or radially moving, respectively, the latch 530 along the direction of the arrow R is performed by the worm drive 540. The worm drive 540 has a pitched drive rod 541 which is connected to the locking base 520, and an actuator element 542 which is held in the belt reel 500 so as to be axially displaceable.

The actuator element 542 is linked to the pitched drive rod 541 and in the case of relative rotation between the belt reel 500 and the pitched drive rod 541 is pushed out of the belt reel 500 and in the direction of the pivotable latch 530. Upon reaching a predefined maximum relative rotary angle between the belt reel 500 and the locking base 520, the actuator element 542 will pivot or move, respectively, the pivotable latch 530 in a radially outward manner, on account of which the latch 530 is pivoted into the locking gear wheel 550 and belt force limitation is deactivated.

The actuator element 542 preferably has a slope 542a which upon axial displacement of the actuator element 542 as discussed in a manner parallel with and spaced apart from the rotation axis 501 strikes the latch 530 and pivots the latter based on the principle of force deflection on an inclined plane.

FIG. 18 shows the arrangement of the pitched drive rod 541, of the actuator element 542, and of the latch 530 in relation to one another in a cross section. To be seen are moreover the belt reel 500, the locking base 520, and the locking gear wheel 550 into which the latch 530 may be pivoted by being lifted by means of the inclined plane 542a of the actuator element 542.

FIG. 19 shows the radial motion of the pivotable latch 530 along the direction of the arrow R in the direction of the locking gear wheel 550 which is fixed to the frame, in a further schematic illustration.

FIG. 20 shows component parts of a sixth exemplary embodiment for a belt retractor for a safety belt. A belt reel 600, a locking base 620, a rotary element 630, and a blocking element 660 can be seen.

FIG. 21 again shows the component parts according to FIG. 20 in another three-dimensional illustration, as viewed obliquely from the side. Additionally in FIG. 21, a receptacle stud hole 605 can be seen in the belt reel 600, the blocking element 660 being pushed into said stud hole 605 in the axial direction and so as to be spaced apart from the rotation axis 601 of the belt reel 600.

The blocking element 660 is preferably held in the receptacle stud hole 605 in a spring-loaded manner; such a spring is not explicitly shown in FIG. 21 for reasons of clarity. In principle, a spring as has been discussed in the context of FIGS. 7 and 8 and has been identified there by the reference sign 250 may be employed.

Prior to relative rotation between the belt reel 600 and the locking base 620, the spring-loaded blocking element 660 will be supported on the rotary element 630, such that the blocking element 660 is separated by the rotary element 630 from the locking base 620.

Should relative rotation between the belt reel 600 and the locking base 620 arise in the context of belt force limitation, the blocking element 660 will slide along on the rotary element 630 until the former hits a through hole 631 in the rotary element 630. As soon as the blocking element 600 and the through hole 631 are mutually aligned, the blocking element 660, on account of the spring force of the spring (not shown), will glide through the through hole 631 in the rotary element 630 in the direction of the locking base 620.

As soon as the blocking element 660 has passed the through hole 631, the blocking element 660 in the context of further relative rotation between the belt reel 600 and the locking base 620 will continue to rotate the rotary element 630. As soon as the blocking element 660 ends up in the region of a depression 621 in the locking base 660, said blocking element 660 will glide into this depression 621, leading to further relative rotation between the belt reel 600 and the locking base 620 being blocked.

In other words, termination of relative rotation between the belt reel 600 and the locking base 620 arises, as soon as, on account of the belt reel 600 being torsioned in relation to the locking base 620, the blocking element 660, the through hole 631 in the rotary element 630, and the depression 621 in the locking base 620 are mutually aligned.

Figure 24:
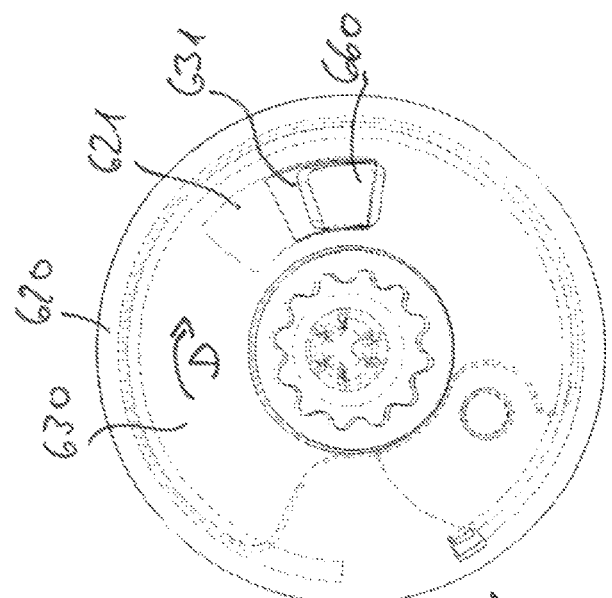
Figure 23:
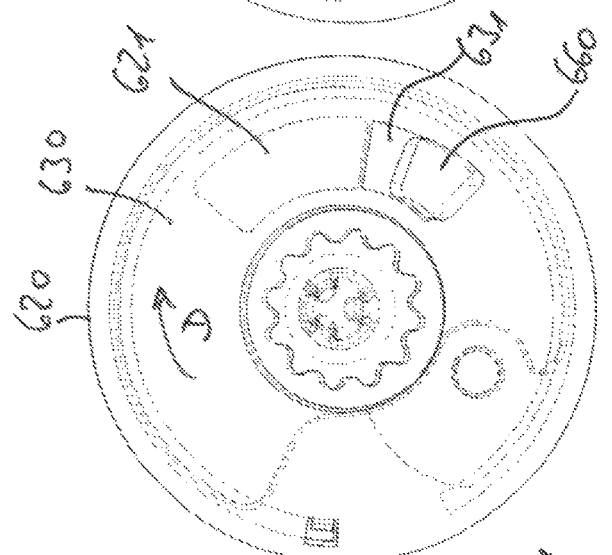
Figure 22:
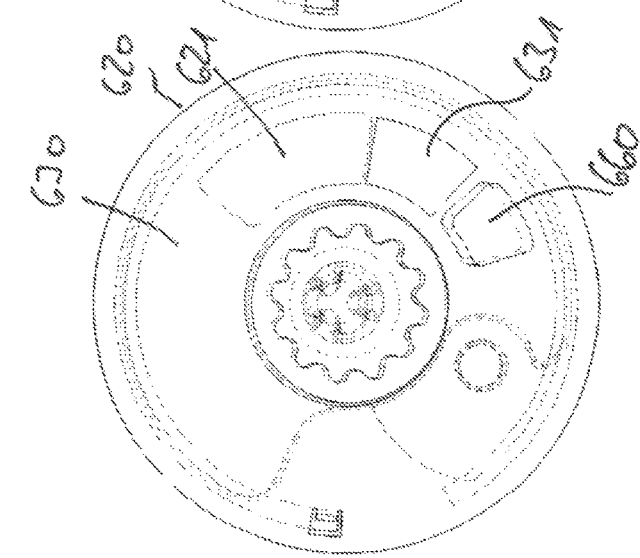

FIGS. 22 to 24 show in more detail the operating mode of the freewheeling gear 650 formed by the depression 621, the rotary element 630, the blocking element 660 and the receptacle stud hole 605.

In FIG. 22 the belt reel 600 and the locking base 620 are in the initial state, that is to say prior to relative rotation between the belt reel and the locking base 620. It can be seen that the blocking element 660 bears on the rotary element 630, and that the blocking element 660, the through hole 631 in the rotary element 630, and the depression 621 in the locking base 620 are mutually torsioned.

FIG. 23 shows the state after the belt reel 600 has been torsioned along the direction of the arrow D in relation to the locking base 620 and, on account of relative rotation of the blocking element 660 on the rotary element 630, the blocking element 660 and the through hole 631 assume a mutual relative position in which the blocking element 660 is mutually aligned with the through hole 631, and the blocking element 660 can pass the through hole 631.

As soon as the rotary position according to FIG. 23 has been reached, the blocking element 660 upon further relative rotation between the belt reel 600 and the locking base 620 will conjointly rotate the rotary element 630, such that subsequently the blocking element 660, the through hole 631 in the rotary element 660, and the depression 621 in the locking base 620 are brought to a rotary position in which the depression 621, the through hole 631, and the blocking element 660 are collectively and mutually aligned. In the position according to FIG. 24, the blocking element 660, on account of spring loading, will be pushed into the depression 621, such that a rotationally fixed connection between the belt reel 600 and the depression 621 arises.

Besides the rotary element 630, the freewheeling gear 650 which has been set forth in the context of FIGS. 20 to 24 may have further rotary elements. In the case of a design embodiment having two or more rotary elements, as soon as the through hole in the upstream rotary element and the blocking element are mutually aligned, the blocking element 660 is initially pushed through the through hole in a first of the rotary elements onto a downstream rotary element by means of the spring force of the spring. Correspondingly, all of the rotary elements in the cascade of rotary elements are torsioned until the blocking element is pushed through the through hole in the rotary elements which are last in the cascade of rotary elements into a depression 621 in the locking base 620.

LIST OF REFERENCE SIGNS

100 Belt reel
101 Rotation axis
120 Locking base
121 Internal toothing
122 Depression
123 Depression
124 Stop
130 Gear element
131 External toothing
132 Stop (lug)
133 Stop (lug)
134 Stop
140 Bearing ring
141 External contour
200 Belt reel
201 Rotation axis
202 Internal toothing
205 Receptacle stud hole
220 Locking base
230 Gear element
231 External toothing
237 Through hole
238 Through hole
240 Bearing ring
241 External contour
250 Spring
260 Blocking element
300 Belt reel
301 Rotation axis
305 Receptacle stud hole
320 Locking base
325 Depression
326 Depression
330 Auxiliary element
331 Sliding lug
332 Sliding lug
333 Support periphery
334 Support periphery
350 Spring
360 Blocking element
400 Belt reel
401 Rotation axis
402 Guide groove
420 Locking base
421 Guide element
430 Rotary element
430a Side
430b Side
431 Guide groove
432 Guide element
450 Freewheeling gear
460 Rotary elements
460a Side
460b Side
461 Guide groove
462 Guide element
500 Belt reel
501 Rotation axis
520 Locking base
530 Latch
540 Worm drive
541 Drive rod
542 Actuator element
542a Slope
550 Locking gear wheel
600 Belt reel
601 Rotation axis
605 Receptacle stud hole
620 Locking base
621 Depression
630 Rotary element
631 Through hole
650 Freewheeling gear
660 Blocking element
D Direction of arrow
EG Eccentric gear
R Direction of arrow

The invention claimed is:

1. A belt retractor for a safety belt, having:
a belt reel for winding up the safety belt,
a locking base which during normal operation is conjointly rotated with the belt reel and the rotary motion of which upon abrupt belt extraction is locked by means of a locking mechanism, and
a belt force limiting installation which upon locking of the locking base permits relative rotation between the belt reel and the locking base,
wherein the belt retractor has a deactivation installation which after a predefined maximum relative rotary angle between the locking base and the belt reel blocks the relative rotation which is permitted between the belt reel and the locking base by the belt force limiting installation and deactivates the belt force limiting installation;
wherein the belt retractor has a freewheeling gear which operates in a rotary-angle-dependent manner and which deactivates the belt force limiting installation as soon as the freewheeling gear has been rotated about a predefined maximum rotary freewheeling angle;
wherein the free wheeling gear includes at least one rotary element positioned to hold a blocking element in the belt reel, and wherein the rotary element is spring-loaded by a spring and is positioned in the belt reel so that prior to relative rotation between the belt reel and the locking base the blocking element is supported on the rotary element and is separated by the rotary element from the locking base; and wherein the blocking element is configured to push through a hole in the rotary element by the spring force of the spring as soon as this is possible due to the blocking element and the hole being mutually aligned as a result of the relative rotation between the belt reel and the rotary element.

2. The belt retractor as claimed in claim 1, wherein locking base includes a depression and wherein the blocking element is pushed through the hole in the rotary element into the depression in the locking base by means of the spring force of the spring as soon as the hole in the rotary element, and the depression are mutually aligned.

3. The belt retractor as claimed in claim 1, wherein the at least one rotary element includes an upstream rotary element and a downstream rotary element and wherein the blocking element is pushed through a hole in the upstream rotary element onto the downstream rotary element by means of the spring force of the spring as soon as the hole in the upstream rotary element and the blocking element are mutually aligned.

4. The belt retractor as claimed in claim 3, wherein the blocking element is pushed through a hole in the downstream rotary element into the depression in the locking base by means of the spring force of the spring as soon as the holes in both the upstream and downstream rotary elements are mutually aligned.

* * * * *